United States Patent
Mizuno et al.

(10) Patent No.: US 8,517,846 B2
(45) Date of Patent: Aug. 27, 2013

(54) SLIDING TYPE TRIPOD CONSTANT VELOCITY JOINT

(75) Inventors: Koichiro Mizuno, Kashiwara (JP); Yoshinari Sakai, Takahama (JP); Tatsuya Yoshii, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/389,686

(22) PCT Filed: Sep. 7, 2010

(86) PCT No.: PCT/JP2010/065328
§ 371 (c)(1),
(2), (4) Date: Feb. 9, 2012

(87) PCT Pub. No.: WO2011/030758
PCT Pub. Date: Mar. 17, 2011

(65) Prior Publication Data
US 2012/0157216 A1    Jun. 21, 2012

(30) Foreign Application Priority Data
Sep. 8, 2009    (JP) ................................. 2009-207100

(51) Int. Cl.
*F16D 3/205* (2006.01)
*B21D 53/12* (2006.01)

(52) U.S. Cl.
USPC ...................... 464/111; 464/905; 29/898.065

(58) Field of Classification Search
USPC ........... 464/111, 120–123, 132, 905; 384/44, 384/45, 50, 51, 55, 572; 29/898.065, 898.067
See application file for complete search history.

(56) References Cited

U.S. PATENT DOCUMENTS 2,651,552 A * 9/1953 Pitner .............................. 384/51
3,328,097 A    6/1967 Wilson
(Continued)

FOREIGN PATENT DOCUMENTS

EP    0 206 886 A1    12/1986
FR    1.577.881 A    8/1969
(Continued)

OTHER PUBLICATIONS

Extended European Search Report issued Oct. 31, 2012 in Patent Application No. 10815355.2.
(Continued)

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A sliding-type tripod constant velocity joint that includes needle units, each of which is able to prevent rolling elements from falling off in a state where the rolling elements are introduced in a cage, is provided. Each cage (60) of a constant velocity joint (1) forms circulation paths that are trajectories of circulating rolling elements (50), and is formed of a pair of first circulation path forming member (70) and second circulation path forming member (80) that are coupled to face each other so as to respectively support both axial ends of the rolling elements (50). Then, at least one of the circulation path forming members (70 (80)) has a window portion (75 (85)) that is open so as to be able to introduce the rolling elements (50) laterally with respect to a circulating direction into the circulation paths and a rib portion (76 (86)) that is formed so as to extend from a periphery of the window portion (75 (85)) in an introducing direction in which the rolling elements (50) are introduced. After the rolling elements (50) are introduced into the circulation paths, the rib portion (76 (86)) is calked toward an opening of the window portion (75 (85)) such that the rolling elements (50) do not pass through the window portion (75 (85)).

16 Claims, 8 Drawing Sheets

(56) References Cited

U.S. PATENT DOCUMENTS

| | | | |
|---|---|---|---|
| 4,320,565 A * | 3/1982 | Warchol | 29/898.067 |
| 4,768,990 A | 9/1988 | Farrell et al. | |
| 4,830,516 A | 5/1989 | Davenport et al. | |
| 5,073,144 A | 12/1991 | Stenglein et al. | |
| 5,169,239 A | 12/1992 | Schneider | |
| 5,348,512 A | 9/1994 | Hodge | |
| 7,611,289 B2 * | 11/2009 | Oishi | 384/572 |
| 8,162,763 B2 | 4/2012 | Mizuno et al. | |
| 2011/0092298 A1 | 4/2011 | Sakai | |

FOREIGN PATENT DOCUMENTS

| | | |
|---|---|---|
| JP | 59 400016 | 3/1984 |
| JP | 62 255616 | 11/1987 |
| JP | 1 284377 | 11/1989 |
| JP | 2 107807 | 4/1990 |
| JP | 3 37417 | 2/1991 |
| JP | 3-144118 A | 6/1991 |
| JP | 4 17513 | 2/1992 |
| JP | 7 501126 | 2/1995 |
| JP | 2763624 | 3/1998 |
| JP | 2005 98402 | 4/2005 |

OTHER PUBLICATIONS

International Search Report Issued Nov. 9, 2010 in PCT/JP10/65328 Filed Sep. 7, 2010.

* cited by examiner

SLIDING TYPE TRIPOD CONSTANT VELOCITY JOINT

TECHNICAL FIELD

The invention relates to a sliding-type tripod constant velocity joint.

BACKGROUND ART

A sliding-type tripod constant velocity joint includes roller units each of which is rotatably arranged between a raceway groove of an outer ring and a tripod coupled to a shaft. For example, each roller unit of the sliding-type tripod constant velocity joint described in Patent Document 1 includes a roller inserted in the raceway groove of the outer ring, an intermediate member (ring) that rotatably supports the roller and that is externally fitted around a corresponding one of tripod shaft portions of the tripod, and a plurality of rolling elements (balls) that are rollably interposed between the roller and the intermediate member. Each roller unit has the spherical rolling elements, so, when torque is transmitted with such a configuration, resistance due to a slide occurs between the rolling elements and the intermediate member and between the rolling elements and the raceway groove, in addition to rolling resistance.

Then, in order to reduce the resistance, there is, for example, the technique described in Patent Document 2. A sliding-type tripod constant velocity joint described in Patent Document 2 includes needle units that use shaft-like needles as rolling elements. Furthermore, each needle unit has a cage that supports the needles such that the needles are able to circulate around the outer periphery of an intermediate member (block). By so doing, it is possible to reduce resistance due to a slide between the rolling elements and the intermediate member and between the rolling elements and the raceway groove.

RELATED ART DOCUMENT

Patent Document

Patent Document 1: Japanese Patent Application Publication No. 2005-98402
Patent Document 2: Japanese Patent No. 2763624

SUMMARY OF THE INVENTION

Incidentally, each needle unit that uses the needles as the rolling elements is, for example, assembled in such a manner that the rolling elements are fixedly coupled to the cage formed of a plurality of components while being introduced into the cage. In contrast to this, in order to simplify the assembling of the needle unit, the plurality of components are coupled to form the cage in advance. In such a case, the needles are introduced through a window portion provided for the cage. However, with the above configuration, there has been a possibility that, before the needle unit is externally fitted around a tripod shaft portion, the needles fall off through the window portion through which the needles are introduced into the cage.

One of objects of the invention is to provide a sliding-type tripod constant velocity joint that is made in light of such a situation and that includes needle units, each of which is able to prevent rolling elements from falling off in a state where the rolling elements are introduced into a corresponding one of cages.

Means for Solving the Problems

A sliding-type tripod constant velocity joint according to an aspect of the invention includes: an outer ring that has a cylindrical portion and that has three raceway grooves on an inner peripheral surface thereof, the three raceway grooves extending in a direction of a rotation axis of the outer ring; a tripod that has a boss portion coupled to a shaft and three tripod shaft portions that extend from an outer peripheral surface of the boss portion outward in a radial direction of the boss portion and that are inserted in the corresponding raceway grooves; an intermediate member that is provided around an outer periphery of a corresponding one of the tripod shaft portions so as to be rockable with respect to the tripod shaft portion and that has a torque transmitting surface facing side surfaces of a corresponding one of the raceway grooves; a plurality of shaft-like rolling elements that are provided between the side surfaces of each raceway groove and a corresponding one of the torque transmitting surfaces so as to be rollable along the side surfaces of that raceway groove; and a cage that supports the corresponding rolling elements such that the rolling elements are able to circulate around an outer periphery of a corresponding one of the intermediate members, wherein the cage forms circulation paths that are trajectories of the circulating rolling elements and is formed of a pair of circulation path forming members that are coupled to face each other so as to respectively support both axial ends of the rolling elements, at least one of the circulation path forming members has a window portion that is open so as to be able to introduce the rolling elements into the circulation paths laterally with respect to a circulating direction and a rib portion that is formed so as to extend from a periphery of the window portion toward an introducing direction in which the rolling elements are introduced, and, after the rolling elements are introduced into the circulation paths, the rib portion is calked toward an opening of the window portion such that the rolling elements do not pass through the window portion.

With the invention according to the above aspect, it is possible to provide a sliding-type tripod constant velocity joint that includes needle units, each of which is able to prevent rolling elements from falling off in a state where the rolling elements are introduced in a corresponding one of cages.

EMBODIMENTS OF THE INVENTION

Hereinafter, a specific embodiment of a sliding-type tripod constant velocity joint (hereinafter, simply referred to as "constant velocity joint") according to the invention will be described with reference to the drawings. Here, the constant velocity joint according to the present embodiment will be described by taking the case where the constant velocity joint is used to couple a torque transmission shaft of a vehicle as an example. For example, this is the case where the constant velocity joint is used for a coupling portion at which a shaft portion coupled to a differential gear is coupled to an intermediate shaft of a drive shaft.

Figure 1:
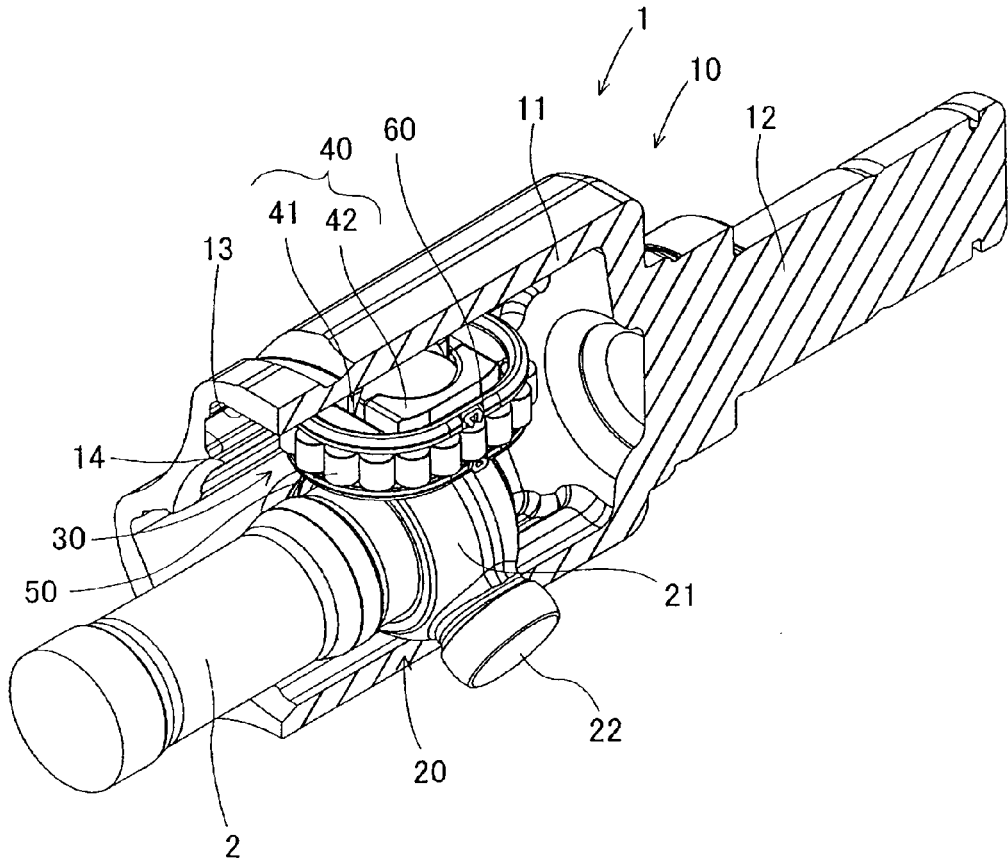
FIG. 1 is a perspective view of a constant velocity joint 1 according to a first embodiment and is a view that shows a state where an outer ring 10 is axially cut away.
Figure 2:
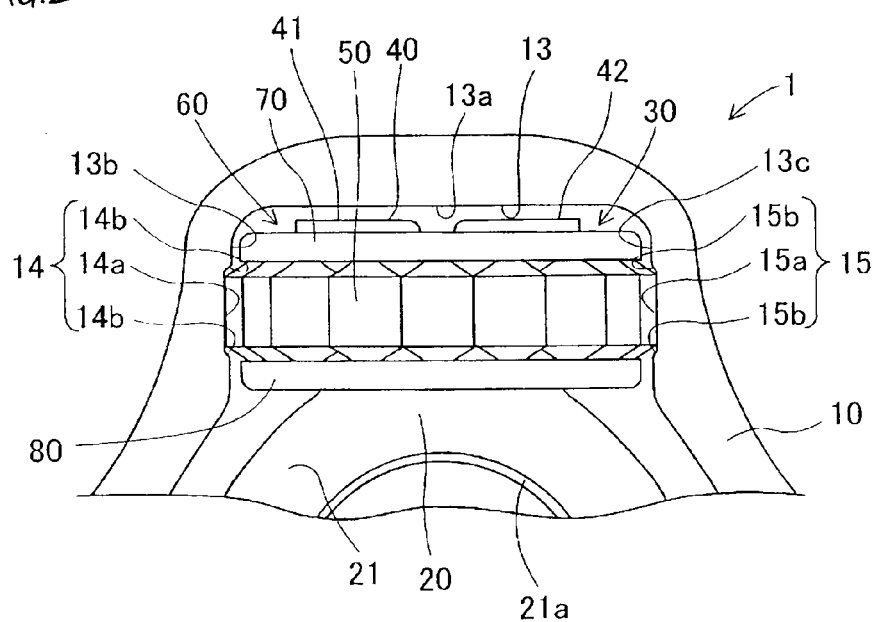
FIG. 2 is a view of part of the constant velocity joint 1 in an assembled state when viewed from an opening of the outer ring 10.
Figure 3:
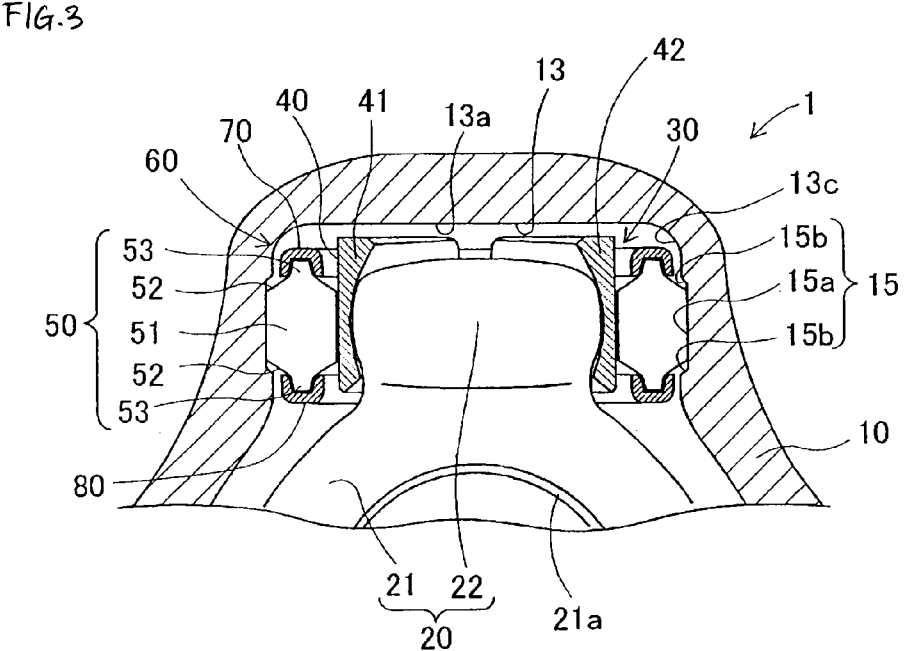
FIG. 3 is a radial sectional view of part of the constant velocity joint 1.

First, a first embodiment of the invention will be described. As shown in FIG. 1 to FIG. 3, the constant velocity joint 1 is formed of an outer ring 10, a tripod 20 and needle units 30. As shown in FIG. 1, the outer ring 10 is formed of a cylindrical portion 11 and a coupling shaft portion 12. The cylindrical portion 11 is formed in a closed-end cylindrical shape. The coupling shaft portion 12 is formed coaxially and integrally with the cylindrical portion 11 so as to extend outward from the bottom of the cylindrical portion 11 in the axial direction. The coupling shaft portion 12 is coupled to the differential gear (not shown).

Then, as shown in FIG. 1 to FIG. 3, three raceway grooves 13 that extend in a direction along the rotation axis of the outer ring (front-rear direction in FIG. 2) are formed on the inner peripheral surface of the cylindrical portion 11. These three raceway grooves 13 are formed at equiangular intervals (at intervals of 120 degrees) in the circumferential direction of the rotation axis of the outer ring 10 on the inner peripheral surface of the cylindrical portion 11. The sectional shape taken perpendicularly to a groove extension direction of each raceway groove 13 has a U shape that is open toward the center of the rotation axis of the outer ring 10. That is, each raceway groove 13 has a groove bottom surface 13a that is formed in a substantially planar shape and side surfaces 13b and 13c that are formed in a substantially planar shape. The side surfaces 13b and 13c are formed so as to be substantially perpendicular to the groove bottom surface 13a and parallel to each other such that the side surface 13b faces the side surface 13c.

Raceway recesses 14 and 15 that extend in the direction along the rotation axis of the outer ring 10 are respectively formed on the side surfaces 13b and 13c. The raceway recesses 14 and 15 are respectively formed at substantially the center portion in the radial direction of the outer ring 10 on the side surfaces 13b and 13c of the raceway groove 13. The opening width (vertical width in FIG. 2 and FIG. 3) of each of the raceway recesses 14 and 15 is formed to gradually increase toward the opening (toward the horizontal center in FIG. 2 and FIG. 3). That is, the raceway recesses 14 and 15 respectively have substantially planar bottom surfaces 14a and 15a and inclined side surfaces 14b and 15b.

As shown in FIG. 1 and FIG. 3, the tripod 20 is arranged inside the cylindrical portion 11 of the outer ring 10. The tripod 20 is formed of a boss portion 21 and three tripod shaft portions 22. The boss portion 21 has an annular shape, and an internal tooth spline 21a is formed on the inner peripheral side of the boss portion 21. The internal tooth spline 21a is fitted and coupled to an external tooth spline formed at an end of an intermediate shaft 2. In addition, the outer peripheral surface of the boss portion 21 is formed substantially in a spherical convex shape.

Each tripod shaft portion 22 is formed to extend outward from the outer peripheral surface of the boss portion 21 in the radial direction of the boss portion 21. These tripod shaft portions 22 are formed at equiangular intervals (at intervals of 120 degrees) in the circumferential direction of the boss portion 21. Then, at least the distal end portion of each tripod shaft portion 22 is inserted in a corresponding one of the raceway grooves 13 of the cylindrical portion 11 of the outer ring 10. The outer peripheral surface of each of the tripod shaft portions 22 is formed in a spherical convex shape. Here, a straight line that passes through the center of curvature of the spherical convex shape and that is perpendicular to the rotation axis of the tripod 20 (rotation axis of the intermediate shaft 2) is perpendicular to the central axis of each tripod shaft portion 22 (hereinafter, also referred to as "tripod axis").

As shown in FIG. 1, each needle unit 30 has an annular shape as a whole, and is arranged on the outer peripheral side of a corresponding one of the tripod shaft portions 22. Furthermore, each needle unit 30 is fitted to a corresponding one of the raceway grooves 13 so as to be movable in the direction in which the raceway groove 13 extends. The needle unit 30 includes an intermediate member 40, a plurality of rolling elements 50 and a cage 60.

The intermediate member 40 is formed of a first split member 41 and a second split member 42. When the first split member 41 and the second split member 42 are viewed as one unit, the outside diameter of the intermediate member 40 as an overall shape is substantially rectangular. Furthermore, when the intermediate member 40 is viewed as a whole, a portion corresponding to a circular hole is formed at the center of the intermediate member 40.

The first split member 41 and the second split member 42 are separately formed so as to have plane-symmetrical shapes with respect to a plane that passes through the tripod axis (vertical direction in FIG. 3) and the rotation axis (front-rear direction in FIG. 3) of the intermediate shaft 2, and are independent of each other. Then, as shown in FIG. 1 and FIG. 3, the first split member 41 and the second split member 42 are arranged so as to sandwich the tripod shaft portion 22 from both sides of the side surfaces 13b and 13c of the raceway groove 13. That is, both split members 41 and 42 are arranged so as to sandwich the tripod shaft portion 22 from both sides in a torque transmitting direction (a direction around the rotation axis of the outer ring 10 or a direction around the rotation axis of the intermediate shaft 2). Then, the pair of split members 41 and 42 are rockably provided with respect to the tripod shaft portion 22 when viewed in any direction perpendicular to the axis of the tripod shaft portion 22.

Here, the first split member 41 that is one component of the intermediate member 40 will be described with reference to FIG. 5 and FIG. 6. Note that the second split member 42 is formed symmetrically from the first split member 41 as described above, so reference numerals are denoted in parentheses in the drawings only, and the detailed description is omitted.

Figure 5:
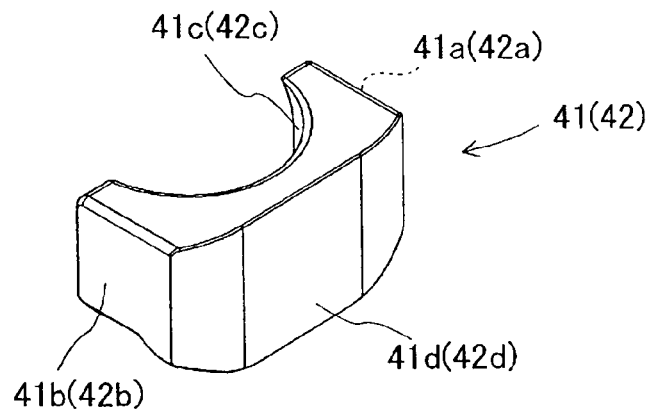
FIG. 5 is a perspective view of a split member 41 (42) of the intermediate member 40.
Figure 6A:
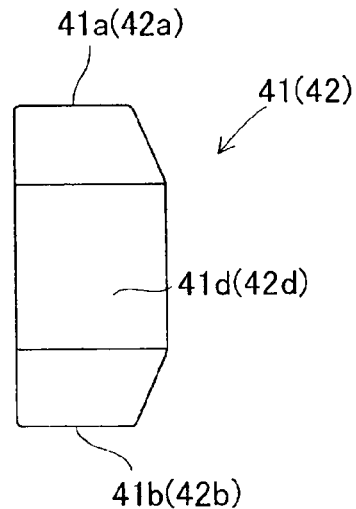
FIG. 6A is a plan view that shows the split member 41 (42).

As shown in FIG. 5 and FIG. 6A, the first split member 41 is formed in a rectangular block shape. The peripheral surface of the split member 41 has end surfaces 41a and 41b in the direction along the rotation axis of the intermediate shaft 2, a tripod contact surface 41c that contacts with the tripod shaft portion 22 and a torque transmitting surface 41d. Here, when the intermediate member 40 (the first split member 41 and the second split member 42) are viewed as one unit, the end surfaces 41a, 42a, 41b and 42b and the outer peripheral surfaces of the torque transmitting surfaces 41d and 42d form an outer peripheral surface, and the tripod contact surfaces 41c and 42c form an inner peripheral surface.

Figure 6B:
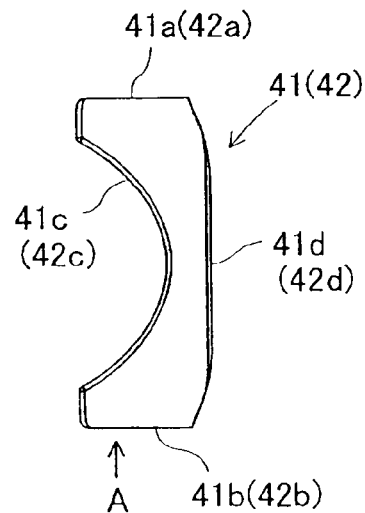
FIG. 6B is a side view that shows the split member 41 (42).
Figure 6C:
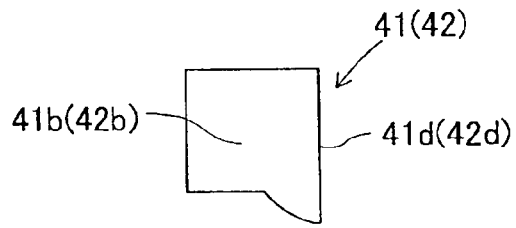
FIG. 6C is a view when viewed in the arrow A direction in FIG. 6A.

The end surfaces 41a and 41b are end surfaces located at the upper side and lower side in FIG. 5, far side and near side in FIG. 6C, that is, both longitudinal ends of the split member 41. Both end surfaces 41a and 41b are formed of a flat surface substantially perpendicular to the torque transmitting surface 41d. That is, both end surfaces 41a and 41b are formed of a flat surface substantially perpendicular to the side surface 13b of the raceway groove 13.

The tripod contact surface 41c is formed in a partially spherical concave shape so as to be in contact with the tripod shaft portion 22 rockably in the axial direction of the outer ring 10 and in the circumferential direction of the outer ring 10. The center of the spherical surface of the tripod contact surface 41c is located in a straight line that passes through the center of the width of the tripod contact surface 41c in the horizontal direction (the thickness of the intermediate member 40) in FIG. 6A and the center of the width of the tripod contact surface 41c in the vertical direction (the width of the intermediate member 40 in the axial direction of the outer ring 10) in FIG. 6B. That is, the tripod contact surface 41c is fitted to the outer peripheral surface of the tripod shaft portion 22, and has a shape such that the tripod contact surface 41c does not come off in the axial direction of the tripod shaft portion 22 in the fitted state. The above tripod contact surface 41c contacts with the tripod shaft portion 22 to allow torque transmission.

As shown in FIG. 6B, the torque transmitting surface 41d is located on the opposite side with respect to the tripod contact surface 41c. The torque transmitting surface 41d faces the side surface 13b (more specifically, the bottom surface 14a of the raceway recess 14) of the outer ring 10, and is formed so as to extend in the direction in which the raceway groove 13 extends. The torque transmitting surface 41d is formed in a flat and rectangular shape, and is located at the center portion in the vertical direction in FIG. 6B. In addition, both end sides of the torque transmitting surface 41d in the direction along the rotation axis of the outer ring 10 are formed so as to be slightly curved. That is, the center of the torque transmitting surface 41d maximally protrudes outward in the horizontal direction in FIG. 3.

Then, the first split member 41 is arranged such that the torque transmitting surface 41d faces one side surface 13b of the raceway groove 13. Note that, similarly, the second split member 42 is arranged such that the torque transmitting surface 42d faces the other side surface 13c of the raceway groove 13. That is, in a position in which the rotation axis of the outer ring 10 coincides with the rotation axis of the intermediate shaft 2 (joint angle is zero degrees), the torque transmitting surfaces 41b and 42d are substantially parallel to a plane that passes through the central axis of the tripod shaft portion 22 and the rotation axis of the intermediate shaft 2. Then, the torque transmitting surfaces 41d and 42d each span a range in which the torque transmitting surfaces 41d and 42d each are contactable with the plurality of (three to four in the present embodiment) shaft-like rolling elements 50.

Figure 4:
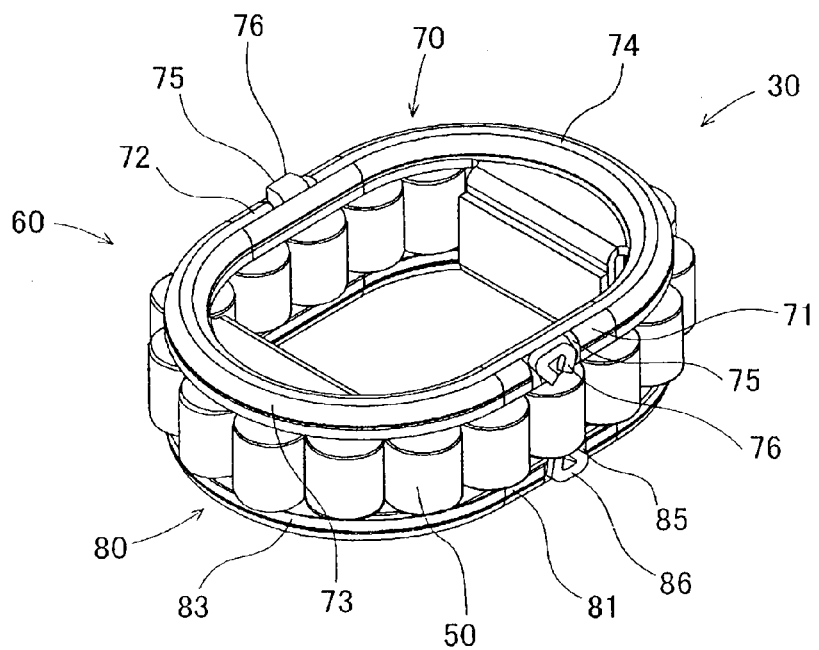
FIG. 4 is a perspective view of a needle unit 30 except an intermediate member 40.

As shown in FIG. 1 to FIG. 4, each rolling element 50 is a shaft-like needle. Then, as shown in FIG. 4, the plurality of rolling elements 50 are arranged so as to circulate around the outer periphery of the intermediate member 40 when the intermediate member 40 is viewed as one unit. A portion of (three to four in the present embodiment) the plurality of rolling elements 50 are provided between each of the bottom surfaces 14a and 15a of the raceway recesses 14 and 15 of the raceway groove 13 and a corresponding one of the torque transmitting surfaces 41d and 42d of the pair of split members 41 and 42 so as to be rollable along the bottom surface 14a or 15a and the torque transmitting surface 41d or 42d. That is, torque is transmitted via the rolling elements 50 between the torque transmitting surface 41d or 42d and the bottom surface 14a or 15a of the raceway groove 13.

Each rolling element 50 is formed of a rolling surface portion 51, inclined surface portions 52 and protruding portions 53. The rolling surface portion 51 is a circular cylinder-shaped member having a rolling surface on its outer periphery. The inclined surface portions 52 are portions that are formed in a tapered shape on both ends of the rolling surface portion 51. The protruding portions 53 each are formed in a circular shape in cross section of the rolling element 50 in a direction perpendicular to the cylinder extension direction (horizontal direction in FIG. 2), and are respectively formed to protrude from the end surfaces of the inclined surface portions 52. The length in the cylinder extension direction of the rolling surface formed on the outer periphery of each rolling surface portion 51 is set so as to be substantially equal to the width of each of the bottom surfaces 14a and 15a of the raceway recesses 14 and 15 and the width of each of the torque transmitting surfaces 41d and 42d of the split members 41 and 42 or slightly shorter than the width of each of the bottom surfaces 14a and 15a.

In addition, each inclined surface portion 52 has the same shape as those of the side surfaces 14b and 15b of the raceway recesses 14 and 15. That is, the rolling surface portion 51 is provided so as to be fitted in the raceway recesses 14 and 15. By so doing, the inclined surface portions 52 of each rolling element 50 are engageable with the side surfaces 14b and 15b of the raceway recesses 14 and 15 in the axial direction of the rolling element 50. That is, each rolling element 50 is restricted by the raceway recess 14 or 15 from moving in the axial direction of the rolling element 50. Then, the rolling surface on the outer periphery of the rolling surface portion 51 is rollable along the bottom surfaces 14a and 15a of the raceway recesses 14 and 15 and the torque transmitting surfaces 41d and 42d. By so doing, torque is transmitted via the rolling elements 50 between the torque transmitting surface 42c and the side surfaces 13b and 13c of the raceway groove 13.

Each protruding portion 53 is formed to have a diameter smaller than the outside diameter of the rolling surface portion 51. Then, the distance between the distal ends of the protruding portions 53 at both sides, that is, the axial length of the rolling element 50, is formed to be larger than those of the bottom surfaces 14a and 15a of the raceway recesses 14 and 15 and the torque transmitting surfaces 41d and 42d. That is, the protruding portions 53 are located on the outer side in the axial direction of the tripod beyond the raceway recesses 14 and 15 and the torque transmitting surfaces 41d and 42d. The protruding portions 53 located at both axial sides of each rolling element correspond to "both axial end portions of each rolling element" according to the invention.

Figure 7A:
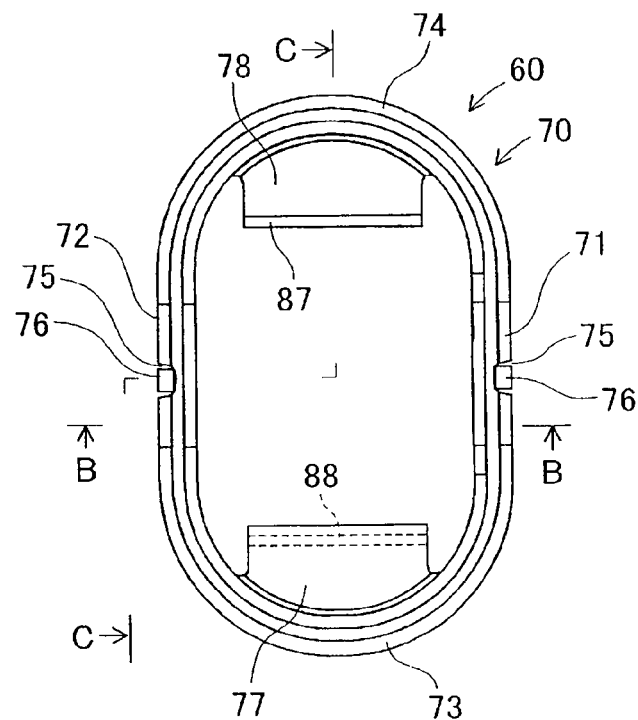
FIG. 7A is a front view of a cage 60.

As shown in FIG. 4 and FIG. 7, the cage 60 is an annular member as an overall shape. The cage 60 supports the rolling elements 50 such that the rolling elements 50 are able to circulate around the outer periphery of the intermediate member 40. Then, the cage 60 is almost accommodated inside a corresponding one of the raceway grooves 13. The cage 60 includes a pair of first circulation path forming member 70 and second circulation path forming member 80 that respectively form circulation paths that are the trajectories of the circulating rolling elements 50. The pair of circulation path forming members 70 and 80 are coupled to face each other so as to sandwich the rolling elements 50 in the axial direction. The direction in which the pair of circulation path forming members 70 and 80 face each other is a direction vertical to the direction in which the rolling elements 50 circulate and is the axial direction of each of the introduced rolling elements 50 in a basic position.

Figure 7B:
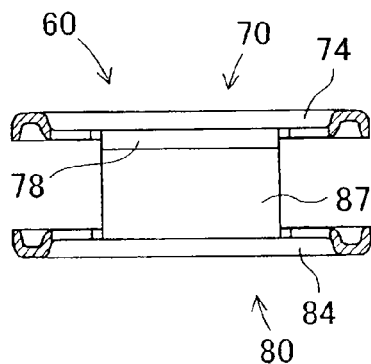
FIG. 7B is a sectional view taken along the line B-B in FIG. 7A.
Figure 7C:
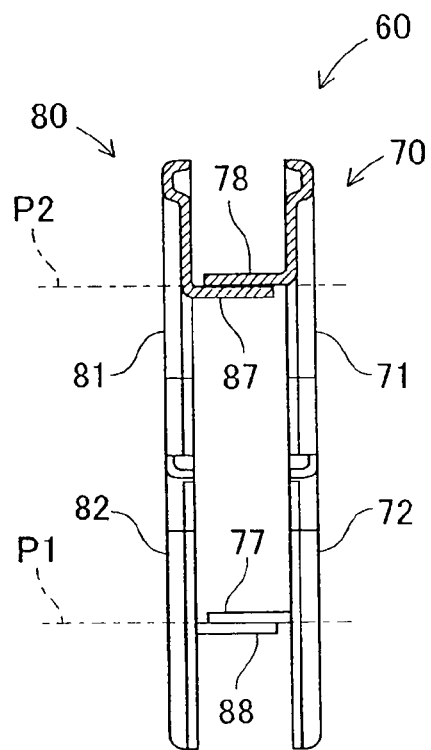
FIG. 7C is a sectional view that is taken along the line C-C in FIG. 7A.

The protruding portions 53 of each rolling element 50 are respectively inserted in the first circulation path forming member 70 and the second circulation path forming member 80. In addition, as shown in FIG. 7B and FIG. 7C, the sectional shape of each of the circulation path forming members 70 and 80 is formed in a U shape such that the circulation path forming members 70 and 80 engage with the inclined surface portions 52 of each rolling element 50. In this way, the pair of circulation path forming members 70 and 80 support both protruding portions 53. That is, the distance between the inner periphery and outer periphery of the pair of circulation path forming members 70 and 80 is formed so as to be larger than that of each protruding portion 53 of each rolling element 50 and smaller than the maximum diameter of each rolling surface portion 51. Thus, the rolling surface portion 51 of each rolling element 50 protrudes outward from the outer periphery of the pair of circulation path forming members 70 and 80 and protrudes inward from the inner periphery.

Then, the U-shaped opening sides of the respective circulation path forming members 70 and 80 are provided so as to face each other in a state where the U-shaped opening sides are spaced apart at a distance that is slightly longer than the axial length of each rolling element 50. Thus, the maximum distance between the pair of circulation path forming members 70 and 80 in the facing direction is set so as to be longer than those of the bottom surfaces 14a and 15a of the raceway recesses 14 and 15 and the torque transmitting surfaces 41d and 42d. Then, the pair of circulation path forming members 70 and 80 are accommodated inside the raceway groove 13 of the outer ring 10, and are located outside the raceway recesses 14 and 15 and the torque transmitting surfaces 41d and 42d in the axial direction of the tripod.

Furthermore, the first circulation path forming member 70 forms a rounding circulation path by straight portions 71 and 72 and curved portions 73 and 74. The distance between the straight portions 71 and 72 is set so as to be smaller than the groove width of the raceway groove 13 (the distance between the opening portion of the raceway recess 14 and the opening portion of the raceway recess 15). Then, the second circulation path forming member 80, as well as the first circulation path forming member 70, forms a rounding circulation path by straight portions 81 and 82 and curved portions 83 and 84. In addition, the distance between the straight portions 81 and 82 is equal to the distance between the straight portions 71 and 72. That is, the pair of circulation path forming members 70 and 80 are arranged at a predetermined gap from the side surfaces 13b and 13c of the raceway groove 13. By so doing, the direction in which the rolling elements 50 supported by the cage 60 circulate is a direction along the shapes of the straight portions 71, 72, 81 and 82 and curved portions 73, 74, 83 and 84 in the rounding circulation paths.

Figure 8A:
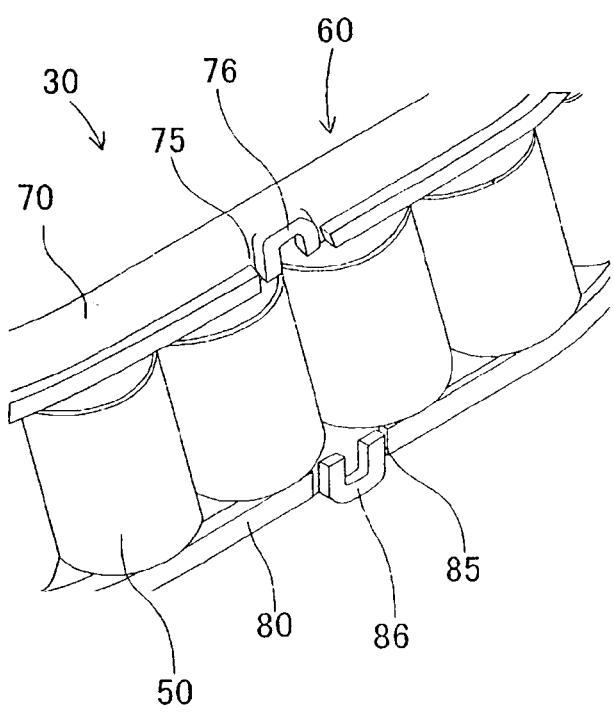
FIG. 8A is an enlarged view of the needle unit 30 before rib portions 76 and 86 are calked after rolling elements 50 are introduced into the cage 60.

In addition, the first circulation path forming member 70 has window portions 75 respectively formed at the outer peripheries of the straight portions 71 and 72 at the centers of the straight portions 71 and 72 in the direction in which the straight portions 71 and 72 extend and rib portions 76 respectively formed at the peripheries of the window portions 75. The window portions 75 are portions formed in the circulation path of the first circulation path forming member 70 in order to introduce the plurality of rolling elements 50 into the cage 60 that is formed of the pair of coupled circulation path forming members 70 and 80. As shown in FIG. 8A, the window portions 75 are open such that the rolling elements 50 may be introduced laterally with respect to the circulating direction into the rounding circulation paths. Specifically, the rolling elements 50 may be introduced from the outer peripheral side of the first circulation path forming member 70, which is the lateral side with respect to the direction in which the straight portions 71 and 72 extend, that is, the circulating direction.

Figure 8B:
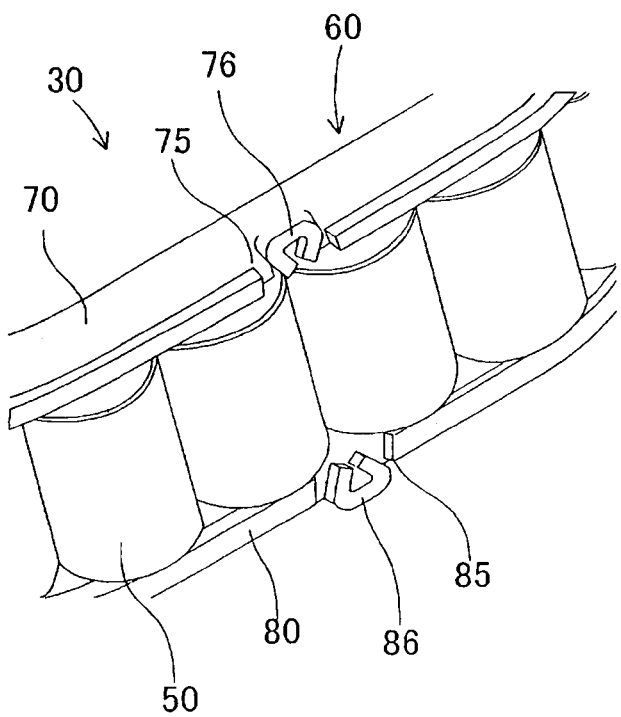
FIG. 8B is an enlarged view of the needle unit 30 after the rib portions 76 and 86 are calked after the rolling elements 50 are introduced into the cage 60.

The rib portions 76 are formed so as to extend from the peripheries of the window portions 75 in the direction in which the rolling elements 50 are introduced. As shown in FIG. 8A, the sectional shape of each rib portion 76 is formed in a U shape such that the rib portion 76 engages with the inclined surface portion 52 of each rolling element 50. Then, as shown in FIG. 8B, the rib portion 76 is pressed from both sides in the circulating direction of the rolling elements 50 and bent after a predetermined number of the rolling elements 50 are introduced into the circulating paths in the cage 60. By so doing, the rib portion 76 is calked so as to be crushed toward the opening of the window portion 75 to thereby prevent the introduced rolling elements 50 from coming off through the window portion 75.

As in the case of the first circulation path forming member 70, the second circulation path forming member 80 has window portions 85 respectively formed at the outer peripheries of the straight portions 81 and 82 at the centers of the straight portions 81 and 82 in the direction in which the straight portions 81 and 82 extend and rib portions 86 respectively formed at the peripheries of the window portions 85. The window portions 85 and the rib portions 86 are respectively formed similarly to the window portions 75 and the rib portions 76 formed in the first circulation path forming member 70, so the detailed description is omitted.

In addition, the window portions 75 and the window portions 85 that are respectively formed in the straight portion 71 and the straight portion 81 are arranged so as to be located at the same circumferential position in the circulation paths. That is, when the rolling elements 50 are introduced into the circulation paths, the protruding portions 53 at both ends of each rolling element 50 respectively pass through the window portion 75 and the window portion 85. This also applies to the window portion 75 and the window portion 85 that are respectively formed in the straight portion 72 and the straight portion 82.

Then, a predetermined number of the rolling elements 50 are introduced into the circulation paths in the cage 60, and a calking process of bending the rib portions 76 and 86 toward the openings of the window portions 75 and 85 is performed. By so doing, the rib portions 76 and 86 are crushed. In this way, as the rib portions 76 and 86 are calked toward the openings of the window portions 75 and 85, the rolling elements 50 introduced into the circulation paths are restricted by the calked rib portions 76 and 86 from moving outward from the circulation paths through the window portions 75 and 85. By so doing, any of the rolling elements 50 introduced in the circulation paths also cannot pass through the window portions 75 and 85. Thus, in a state where a predetermined number of the rolling elements 50 are introduced in the cage 60, it is possible to reliably prevent the rolling elements 50 from falling off.

Here, a first coupling portion 77 and a second coupling portion 78 are formed in the first circulation path forming member 70. Similarly, a first coupling portion 87 and a second coupling portion 88 that are coupled to the facing first circulation path forming member 70 are formed in the second circulation path forming member 80. The first and second coupling portions 77 and 78 of the first circulation path forming member 70 are formed in an L shape that is formed of a flat surface portion that extends from the inner periphery of the curved portion 73 or 74 in the direction in which the straight portions 71 and 72 extend and a coupling surface portion that extends from the end of the flat surface portion in the direction in which the pair of circulation path forming members 70 and 80 face each other (the axial direction of the rolling elements 50). The first and second coupling portions 87 and 88 of the second circulation path forming member 80, as well as the second circulation path forming member 70, are formed in an L shape that is formed of a flat surface portion that extends from the inner periphery of the curved portion 83 or 84 in the direction in which the straight portions 81 and 82 extend and a coupling surface portion that extends from the end of the flat surface portion in the axial direction of the rolling elements 50.

Then, as shown in FIG. 7C, the first coupling portion 77 of the first circulation path forming member 70 is coupled to the second coupling portion 88 of the second circulation path forming member 80 such that a surface of the coupling surface portion on the outer side of the cage 60 is brought into contact with the coupling surface portion of the second coupling portion 88 of the second circulation path forming member 80. At this time, the second coupling portion 88 of the second circulation path forming member 80 is coupled to the first coupling portion 77 such that a surface of the coupling surface portion on the inner side of the cage 60 is brought into contact with the coupling surface portion of the first coupling portion 77. That is, the coupling surface portion of the first coupling portion 77 of the first circulation path forming member 70 is coupled to the coupling surface portion of the second coupling portion 87 of the second circulation path forming member 80 so as to overlap with the coupling surface portion of the second coupling portion 87.

In contrast to this, the second coupling portion 78 of the first circulation path forming member 70 is coupled to the first coupling portion 87 of the second circulation path forming member 80 such that a surface of the coupling surface portion on the inner side of the cage 60 is brought into contact with the coupling surface portion of the first coupling portion 87 of the second circulation path forming member 80. At this time, the first coupling portion 87 of the second circulation path forming member 80 is coupled to the second coupling portion 78 such that a surface of the coupling surface portion on the outer side of the cage 60 is brought into contact with the coupling surface portion of the second coupling portion 78. That is, the coupling surface portion of the second coupling portion 78 of the first circulation path forming member 70 is coupled to the coupling surface portion of the first coupling portion 87 of the second circulation path forming member 80 so as to overlap with the coupling surface portion of the first coupling portion 87.

By so doing, the first coupling portion 77 of the first circulation path forming member 70 and the second coupling portion 88 of the second circulation path forming member 80 are coupled to each other with a reference plane P1 as a mating plane, as shown in FIG. 7C. Similarly, the second coupling portion 78 of the first circulation path forming member 70 and the first coupling portion 87 of the second circulation path forming member 80 are coupled to each other with a reference plane P2 as a mating plane. The reference planes P1 and P2 are symmetrical planes with respect to the center of the cage 60. In this way, the pair of circulation path forming members 70 and 80 that constitute the cage 60 each form the rounding circulation path, and are members having the same shape.

In this way, the cage 60 couples the second circulation path forming member 80 to the first circulation path forming member 70 in such a manner that the second circulation path forming member 80 having the same shape faces the first circulation path forming member 70. At this time, the second circulation path forming member 80 is inverted with respect to the first circulation path forming member 70 such that the straight portions 81 and 82 and the curved portions 83 and 84 are respectively interchanged with respect to the center of the circulation path. That is, the coupling portion at the first coupling portion 77 of the first circulation path forming member 70 and the coupling portion at the second coupling portion 78 are located at point-symmetrical positions with respect to the center of the assembled cage 60.

Furthermore, the first coupling portions 77 and 87 and the second coupling portions 78 and 88 have plane asymmetrical shape with respect to the center of the cage 60. Specifically, as shown in FIG. 7C, the first coupling portions 77 and 87 are formed such that their coupling surface portions are adjacent to the inner peripheral side of the circulation paths. In contrast to this, the second coupling portions 78 and 88 are formed such that their coupling surface portions are adjacent to the outer peripheral side of the circulation paths. That is, the distance from the center of the vertical width of the first circulation path forming member 70 shown in FIG. 7C to the coupling surface portion of the first coupling portion 77 is larger by the amount of the thickness of the coupling surface portion than the distance from the center of the vertical width of the first circulation path forming member 70 to the coupling surface portion of the second coupling portion 78. This also applies to the first coupling portion 87 and second coupling portion 88 of the second circulation path forming member 80.

In addition, as shown in FIG. 7C, the first coupling portion 77 and second coupling portion 88 and the second coupling portion 78 and first coupling portion 87 are respectively coupled to each other so as to form a U shape that opens outward of the cage 60. A surface adjacent to the non-open side of the bottom (inner side of the cage 60, and, hereinafter, referred to as "bottom inner side surface") of the U shape is formed in a flat shape. Then, both the U-shaped bottom inner side surfaces respectively formed by coupling are provided so as to be parallel to and face each other. Furthermore, the distance spaced between the bottom inner side surfaces is substantially equal to the distance between the end surfaces 41a and 41b (42a and 42b) of the split member 41 (42) in the direction along the rotation axis of the intermediate shaft 2. In addition, each open-side surface of the bottom of the U shape formed by each coupling is formed in a flat shape parallel to the bottom inner side surface.

Then, in a state where the rolling elements 50 are located in the raceway recesses 14 and 15 and on the torque transmitting surfaces 41d and 42d at positions closest to the groove bottom of the raceway groove 13 (upper side in FIG. 3) and the cage 60 is located closest to the groove bottom of the raceway groove 13 with respect to the rolling elements 50, a gap is set so as to be provided between the cage 60 and the groove bottom surface 13a of the raceway groove 13. This is determined on the basis of the axial displacement between the raceway recesses 14 and 15 and torque transmitting surfaces 41d and 42d and the rolling surface portions 51 of the rolling elements 50, the axial displacement between the rolling elements 50 and the cage 60, the thickness of each of the pair of circulation path forming members 70 and 80 of the cage 60 in the axial direction, and the like.

Furthermore, the opening portion of the raceway groove 13 is provided so as to be located on an inner side of the cage 60 in the radial direction of the outer ring 10. That is, the second circulation path forming member 80 located at the radially inner side of the cage 60 is in contact with the rolling elements 50 on the outer side in the radial direction of the outer ring 10; however, the second circulation path forming member 80 is not restricted by anything on the inner side in the radial direction of the outer ring 10.

The operation of the above described constant velocity joint 1 will be described. The coupling shaft portion 12 that is one end of the outer ring 10 is coupled to the differential gear. As the outer ring 10 receives torque to rotate, the torque is transmitted from the outer ring 10 to the rolling elements 50 of each needle unit 30, which are fitted in the raceway recesses 14 and 15 of each raceway groove 13. Then, the torque is transmitted from the rolling elements 50 to the torque transmitting surface 41d or torque transmitting surface 42d of the pair of split members 41 and 42, which is in contact with the rolling elements 50 transmitting the torque. Then, the torque is transmitted from the tripod contact surface 41c of the first split member 41 or the tripod contact surface 42c of the second split member 42, transmitting the torque, to a corresponding one of the tripod shaft portions 22.

Then, the rolling elements 50 are supported so as to be able to circulate around the outer periphery of a corresponding one of the intermediate members 40. Thus, the rolling elements 50 roll between the torque transmitting surface 41d of the split member 41 and the bottom surface 14a of the raceway recess 14 without causing a slip in the extending direction of the raceway groove 13 when it is assumed that one of the first split member 41 and the second split member 42, transmitting the torque, is the first split member 41. By so doing, occurrence of induced thrust force is suppressed to reduce a power loss and occurrence of vibration due to sliding resistance. In addition, this also applies to the case where one of the first split member 41 and the second split member 42, transmitting the torque, is the second split member 42.

In addition, one of the pair of split members 41 and 42, receiving the torque via the plurality of rolling elements 50, transmits the torque to the tripod shaft portion 22 with which the tripod contact surfaces 41c and 42c contact. At this time, when a joint angle is set as described above, each tripod shaft portion 22 reciprocally moves (oscillates) in the direction along the rotation axis of the outer ring 10. At this time, the needle unit 30 externally fitted around the tripod shaft portion 22 also follows, and the needle unit 30 also moves reciprocally in a similar manner. In addition, the tripod contact surfaces 41c and 42c of the split members 41 and 42 of the intermediate member 40 are in contact with the tripod shaft portion 22, so the split members 41 and 42 follow movement of the tripod shaft portion 22 in the radial direction of the outer ring 10. Therefore, the split members 41 and 42 slide over the rolling elements 50 in the radial direction of the outer ring 10. By so doing, the point of a load at which torque is applied most in the torque transmitting surfaces 41d and 42d of the split members 41 and 42 varies so as to reciprocally move in the axial direction of the rolling elements.

However, the pair of split members 41 and 42 are independent of each other at the power transmitting side and its opposite side. By so doing, even when the point of a load that occurs at the torque transmitting side and that is applied from the tripod shaft portion 22 varies, the action of one of the pair of split members 41 and 42, transmitting torque, does not influence the action of its opposite side split member. Thus, because any of the split members 41 and 42, located at the opposite side, is able to prevent application of large force to the raceway groove 13, this can suppress occurrence of induced thrust force.

Furthermore, with the above described constant velocity joint 1, the rolling elements 50 are fitted in the raceway recess 14 or 15. By so doing, when force that moves the rolling elements 50 in the axial direction occurs because of a skew, movement of the rolling elements 50 in the axial direction is restricted by the raceway recesses 14 and 15. Incidentally, a portion of the pair of circulation path forming members 70 and 80, which constitute the circulation paths, are located on the outer side in the axial direction of the tripod with respect to the raceway recesses 14 and 15 and the torque transmitting surfaces 41d and 42d. Thus, the raceway recesses 14 and 15 and the torque transmitting surfaces 41d and 42d exhibit the effect of restricting movement of the rolling elements 50 due to a skew, and the cage 60 is configured so as not to exhibit the effect of restricting the movement. That is, the pair of circulation path forming members 70 and 80 of the cage 60 do not restrict movement of the rolling elements 50 in the axial direction due to a skew.

Particularly, in a state where the rolling elements 50 are located in the raceway recesses 14 and 15 and on the torque transmitting surfaces 41d and 42d at positions closest to the groove bottom surface 13a of the raceway groove 13 and the cage 60 is located closest to the groove bottom surface 13a of the raceway groove 13 with respect to the rolling elements 50, a gap is provided between the cage 60 and the groove bottom surface 13a of the raceway groove 13. By so doing, when a skew occurs, it is possible to prevent the cage 60 from contacting with the groove bottom surface 13a of the raceway groove 13 of the outer ring 10.

Furthermore, each cage 60 is arranged at a gap from the side surfaces 13b and 13c of a corresponding one of the raceway grooves 13. By so doing, it is possible to prevent the cage 60 from contacting with the side surfaces 13b and 13c of the raceway groove 13. In addition, the calked rib portions 76 and 86 that are located at the outer peripheral side of the cage 60 are set so as to be accommodated in the gap, so, similarly, even when a skew occurs, this prevents the rib portions 76 and 86 from contacting with the groove bottom surface 13a or side surface 13b or 13c of the raceway groove 13 of the outer ring 10.

With the above described constant velocity joint 1, the pair of circulation path forming members 70 and 80 that constitute the cage 60 are configured to respectively have the window portions 75 and 85 and the rib portions 76 and 86. Then, the rolling elements 50 are introduced through the window portions 75 and 85 of the cage 60, and, after the predetermined number of the rolling elements 50 are introduced into the circulation paths, the rib portions 76 and 86 formed at the peripheries of the window portions 75 and 85 are bent from both ends in its widthwise direction to thereby calk the rib portions 76 and 86 toward the openings of the window portions 75 and 85. In this way, as the rib portions 76 and 86 are calked toward the openings of the window portions 75 and 85, the rolling elements 50 introduced in the circulation paths are restricted by the calked rib portions 76 and 86 from moving through the window portions 75 and 85 toward the outer side of the circulation paths. By so doing, the rolling elements 50 are not able to pass through the window portions 75 and 85, so it is possible to prevent the rolling elements 50 from falling off from the cage 60.

In addition, the cage 60 is formed in such a manner that the pair of circulation path forming members 70 and 80 are fixedly coupled to each other in advance. Thus, in comparison with the case where the cage 60 formed of a plurality of components is fixedly coupled to be assembled while introducing the rolling elements 50 into the cage 60, it is possible to easily perform assembling. Thus, the intermediate member 40 is further arranged on the inner peripheral side of the cage 60 to form the needle unit 30 to thereby make it possible to simplify the process of externally fitting the needle unit 30 around the tripod shaft portion 22.

Furthermore, the window portions 75 and 85 that are respectively formed in the pair of circulation path forming members 70 and 80 are arranged so as to be located at the same circumferential position in the circulation paths. That is, each rolling element 50 is introduced in such a manner that the protruding portions 53 that are both ends of each rolling element 50 pass through the window portions 75 and 85 at the same time. By so doing, it is possible to reduce the amount of opening between the window portions 75 and 85 in the axial direction of the rolling elements 50. In addition, by forming the window portions 75 and 85 such that the rolling elements 50 may be introduced into the circulation paths without inclination, it is possible to easily introduce the rolling elements 50.

The rib portions 76 and 86 of the pair of circulation path forming members 70 and 80 are configured to be calked in the circulating direction in which the rolling elements 50 circulate. That is, the widthwise direction of each of the rib portions 76 and 86 is set in the circulating direction in which the rolling elements 50 circulate, and the rib portions 76 and 86 are calked from both ends in the widthwise direction to thereby calk the rib portions 76 and 86 toward the openings of the window portions 75 and 85. By so doing, the calked rib portions 76 and 86 are crushed, and it is possible to improve the strength of the rib portions 76 and 86. Thus, it is possible to reliably prevent the rolling elements 50 from falling off.

In addition, conventionally, the window portions 75 and 85 that introduce the rolling elements 50 are formed at the inner peripheral sides of the circulation path forming members 70 and 80. This is because, after the rolling elements 50 are introduced into the cage 60, there is no possibility that the rolling elements 50 fall off at the time when the intermediate member 40 is arranged on the inner peripheral side of the cage 60 to form the needle unit 30. In contrast to this, in the present embodiment, the window portions 75 and 85 and the rib portions 76 and 86 are respectively located at the outer peripheral sides of the circulation path forming members 70 and 80.

By so doing, the rolling elements 50 are introduced from the outer peripheral side of the circulation paths. in the above configuration, after the rolling elements 50 are introduced into the cage 60, the rolling elements 50 are restricted by the rib portions 76 and 86 from moving toward the outer side of the circulation paths and are not able to pass through the window portions 75 and 85, so it is possible to prevent the rolling elements 50 from falling off irrespective of the presence or absence of the intermediate member 40. Then, it is possible to employ the configuration that the rolling elements 50 are introduced from the outer peripheral side of the circulation paths to thereby make it easy to introduce the rolling elements 50. Thus, it is possible to improve workability at the time of assembling.

In addition, the cage 60 is formed of the coupled circulation path forming members 70 and 80 having the same shape. In addition, the pair of circulation path forming members 70 and 80 respectively support the protruding portions 53 that are both axial ends of each rolling element 50, and respectively form the rounding circulation paths. Here, the reference planes P1 and P2 that are common to both the pair of circulation path forming members 70 and 80, and the respective coupling surfaces are formed to extend so as to be coupled at the reference planes P1 and P2. That is, each circulation path forming member 70 (80) is configured to have the first coupling portion 77 (87) and the second coupling portion 78 (88) that are coupled to the facing circulation path forming member 80 (70).

By so doing, the pair of circulation path forming members 70 and 80 that constitute the cage 60 may be formed of members having the same shape. By forming the cage 60 in this way, in comparison with the case where circulation path forming members having different shapes are coupled, it is possible to simplify the process of assembling the cage 60. Furthermore, because the circulation path forming members 70 and 80 have the same shape, management of the members may be simplified and, in addition, may be produced through the same process, so production cost may be reduced.

Furthermore, the first coupling portions 77 and 87 and second coupling portions 78 and 88 of the pair of circulation path forming members 70 and 80 have a plane asymmetrical shape with respect to the center of the cage 60. Then, the first coupling portion 77 of the first circulation path forming member 70 is coupled to the second coupling portion 88 of the second circulation path forming member 80 so as to overlap with the second coupling portion 88. Furthermore, the second coupling portion 78 of the first circulation path forming member 70 is coupled to the first coupling portion 87 of the second circulation path forming member 80 so as to overlap with the first coupling portion 87. By so doing, the cage 60 forms the circulation paths for the rolling elements 50, while the first circulation path forming member 70 and the second circulation path forming member 80 may be made of members having the same shape.

Figure 9:
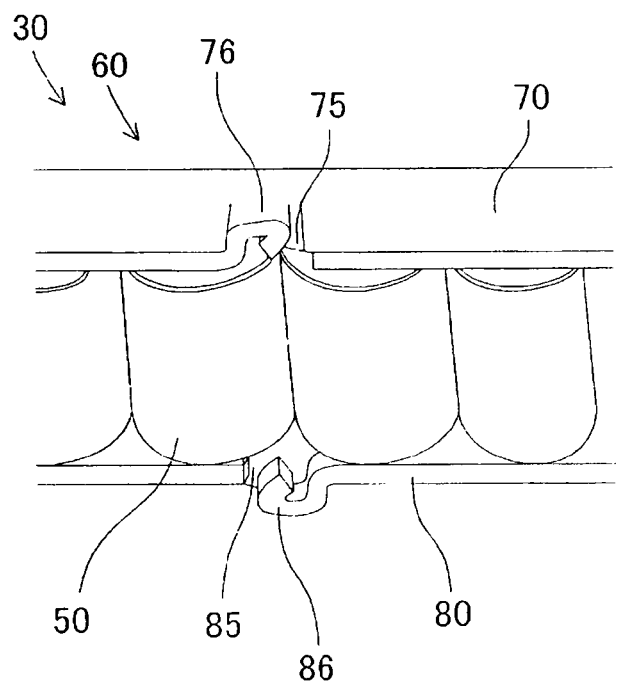
FIG. 9 is an enlarged view of the needle unit 30 after the rib portions 76 and 86 are calked after the rolling elements 50 are introduced into the cage 60 in an alternative embodiment.

In the first embodiment, the rib portions 76 and 86 of the pair of circulation path forming members 70 and 80 are configured such that each widthwise direction is set in the circulating direction in which the rolling elements 50 circulate and each of the rib portions 76 and 86 is calked from both ends in the widthwise direction. By so doing, the rib portions 76 and 86 are calked toward the openings of the window portions 75 and 85. In contrast to this, as shown in FIG. 9, each of the rib portions 76 and 86 may be configured to be calked from only one end in the widthwise direction. By so doing, the rib portions 76 and 86 are calked toward the openings of the window portions 75 and 85. Thus, the rolling elements 50 are restricted by the rib portions 76 and 86 from moving toward the outer side of the circulation paths and are not able to pass through the window portions 75 and 85, so it is possible to prevent the rolling elements 50 from falling off from the cage 60.

Next, a second embodiment of the invention will be described. The configuration of the second embodiment will be described with reference to FIG. 10. Here, the configuration of the second embodiment mainly differs from that of the first embodiment in that the direction in which the rib portions 76 and 86 in the cage 60 are calked. Note that the other configuration is the same as that of the first embodiment, so the detailed description is omitted. Hereinafter, only the difference will be described.

Figure 10A:
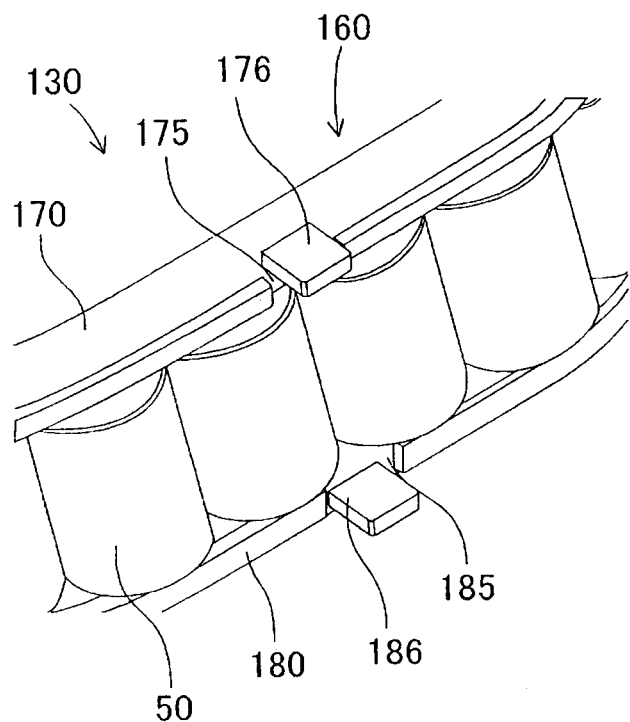
FIG. 10A is an enlarged view of a needle unit 130 before rib portions 176 and 186 are calked after rolling elements 50 are introduced into a cage 160 in a second embodiment.

A cage 160 is formed of a pair of first circulation path forming member 170 and second circulation path forming member 180 that form circulation paths that are the trajectories of the circulating rolling elements 50. The pair of circulation path forming members 170 and 180 are arranged to face each other so as to sandwich the rolling elements 50 in the axial direction. Furthermore, the first circulation path forming member 170 has window portions 175 respectively formed at the outer peripheries of the straight portions 71 and 72 at the centers of the straight portions 71 and 72 in the direction in which the straight portions 71 and 72 extend and rib portions 176 respectively formed at the peripheries of the window portions 175. The window portions 175 are portions formed in the circulation path of the first circulation path forming member 170 in order to introduce the plurality of rolling elements 50 into the cage 160 that is formed of the pair of coupled circulation path forming members 170 and 180. As shown in FIG. 10A, the window portions 175 are open such that the rolling elements 50 may be introduced laterally with respect to the circulating direction into the rounding circulation paths. Specifically, the rolling elements 50 may be introduced from the outer peripheral side of the first circulation path forming member 170, which is the lateral side with respect to the direction in which the straight portions 71 and 72 extend, that is, the circulating direction.

Figure 10B:
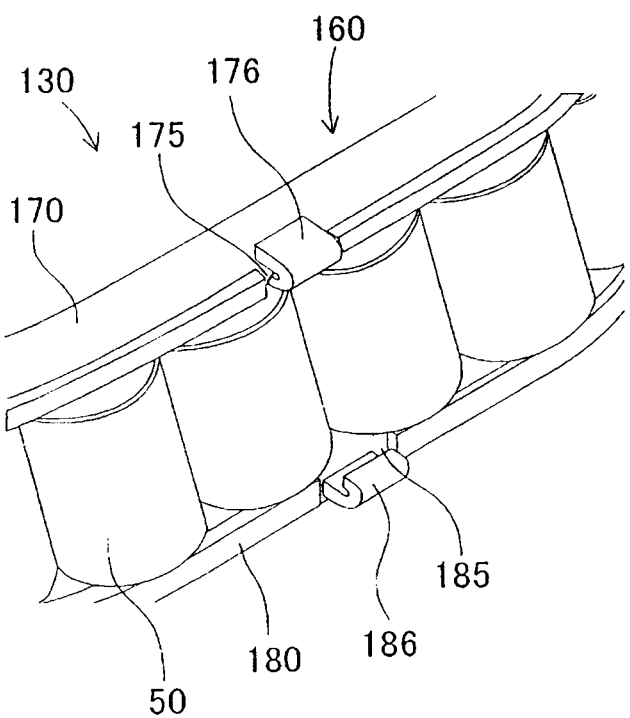
FIG. 10B is an enlarged view of the needle unit 130 after the rib portions 176 and 186 are calked after the rolling elements 50 are introduced into the cage 160 in the second embodiment.

The rib portions 176 are formed so as to extend from the peripheries of the window portions 175 in the direction in which the rolling elements 50 are introduced. As shown in FIG. 10A, the sectional shape of each rib portion 176 is formed in a substantially flat shape. Then, as shown in FIG. 10B, the rib portion 176 is pressed from both sides in the circulating direction of the rolling elements 50 and bent to be calked after a predetermined number of the rolling elements 50 are introduced into the circulating paths of the cage 160. By so doing, the rib portion 176 is calked so as to be crushed toward the opening of the window portion 175 to thereby prevent the introduced rolling elements 50 from passing through the window portion 175.

As in the case of the first circulation path forming member 170, the second circulation path forming member 180 has window portions 185 respectively formed at the outer peripheries of the straight portions 81 and 82 at the centers of the straight portions 81 and 82 in the direction in which the straight portions 81 and 82 extend and rib portions 186 respectively formed at the peripheries of the window portions 185. The window portions 185 and the rib portions 186 are respectively formed similarly to the window portions 175 and the rib portions 176 formed in the first circulation path forming member 170, so the detailed description is omitted.

In addition, the window portion 175 and the window portion 185 that are respectively formed in the straight portion 71 and the straight portion 81 are arranged so as to be located at the same circumferential position in the circulation paths. That is, when the rolling elements 50 are introduced into the circulation paths, the protruding portions 53 at both ends of each rolling element 50 respectively pass through the window portion 175 and the window portion 185. This also applies to the window portion 175 and the window portion 185 that are respectively formed in the straight portion 72 and the straight portion 82.

With the above configuration as well, the same advantageous effects to those of the first embodiment are obtained. In addition, the rib portions 176 and 186 are calked in the axial direction of the rolling elements 50 toward the openings of the window portions 175 and 185. By so doing, it is possible to reliably prevent the rolling elements from falling off, and the calked rib portions 176 and 186 are crushed, so it is possible to improve the strength of the rib portions 176 and 186.

Figure 11A:
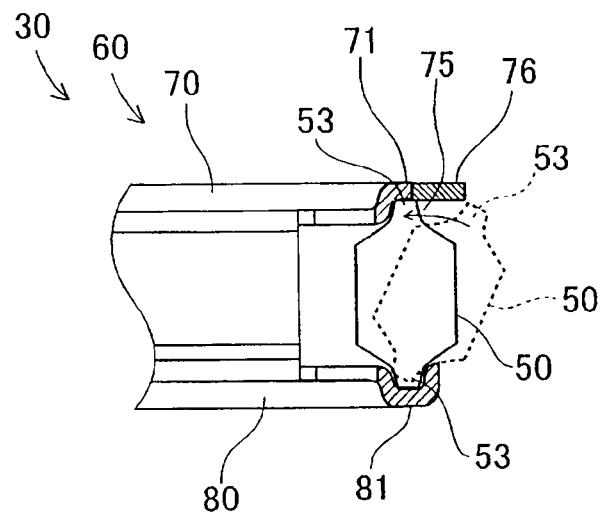
FIG. 11A is an enlarged view of the needle unit 30 in a state where the rolling elements 50 are introduced into the cage 160 in an alternative embodiment when viewed in a circulating direction in which the rolling elements 50 circulate.
Figure 11B:
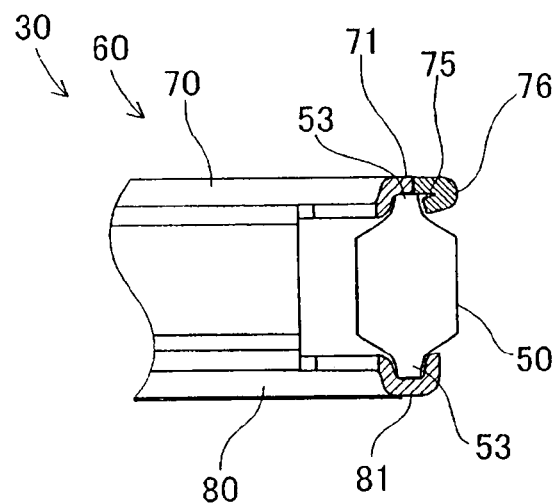
FIG. 11B is an enlarged view of the needle unit 30 after the rib portion 76 is calked after the rolling elements 50 are introduced into the cage 160 in the alternative embodiment when viewed in the circulating direction in which the rolling elements 50 circulate.

In the first and second embodiments, the window portions 75 and 85 or 175 and 185 and rib portions 76 and 86 or 176 and 186 of the cage 60 or 160 are arranged so as to be located at the same circumferential position in the circulation paths. In contrast to this, window portions and rib portions may be provided only at one side. With the above configuration, for example, as shown in FIG. 11A, first, the lower-side protruding portion 53 of each rolling element 50 is inserted into the straight portion 81 of the second circulation path forming member 80. Subsequently, the rolling element 50 is rotated about the lower-side protruding portion 53 as a base point such that the upper-side protruding portion 53 of the rolling element 50 passes through the window portion 75 to thereby insert the upper-side protruding portion 53 into the straight portion 71 of the first circulation path forming member 70. By so repeating a predetermined number of times, the plurality of rolling elements 50 are introduced into the circulation paths. Then, as shown in FIG. 11B, the rib portion 76 is calked in the axial direction of the rolling elements 50, so the rolling elements 50 are restricted by the rib portion 76 from moving toward the outer side of the circulation paths, and are not able to pass through the window portion 75.

With the above configuration as well, the same advantageous effects as those of the first and second embodiments are obtained. In addition, by providing the window portion 75 only at one side at a predetermined circumferential position in the circulation paths, it is possible to simplify the process of calking the rib portion 76 in assembling. However, in the above configuration, when the rolling elements 50 are introduced into the circulation paths, it is necessary that each rolling element 50 is inclined and is then rotated about the lower-side protruding portion 53 of the rolling element 50 as a base point. Therefore, in comparison with the configuration that the window portions 75 and 85 are arranged at the same circumferential position, the man-hour at the time of introducing the rolling elements 50 increases. Thus, it is desirable to appropriately set the configuration of the window portions in light of the strength required for the needle unit 30 or 130, a usage mode, and the like.

In addition, the rib portions 76 and 86 or 176 and 186 are calked by bending the rib portions 76 and 86 or 176 and 186 so as to be crushed. In contrast to this, for example, the rib portions 76 and 86 or 176 and 186 may be plastically deformed so as to form the sectional shape of each rib portion in an L shape or a circular arc shape along the outer shapes of the circulation path forming members 70 and 80 or 170 and 180. By so doing, it is possible to reliably prevent interference with another member, such as interference with the cage 60 or 160 and the groove bottom surface 13a of the raceway groove 13 of the outer ring 10.

Other than the above, in the first and second embodiments, the window portions 75 and 85 or 175 and 185 and rib portions 76 and 86 or 176 and 186 of the cage 60 or 160 are respectively located at the outer peripheral sides of the circulation path forming members 70 and 80 or 170 and 180. In contrast to this, they may be located at the inner peripheral sides of the circulation path forming members 70 and 80 or 170 and 180. With the above configuration, in comparison with the case where the window portions 75, and the like, are located at the outer peripheral sides, it is hard for the rolling elements 50 to be introduced into the circulation path. However, the rib portions 76 and 86 or 176 and 186 that are calked toward the openings of the window portions 75 and 85 or 175 and 185 are located at the inner peripheral sides of the cage 60 or 160, so, for example, it is possible to further reliably prevent interference with another member, such as contact of the cage 60 or 160 with the groove bottom surface 13a of the raceway groove 13 of the outer ring 10. Thus, it is possible to improve the flexibility of design of the outer ring 10 or the cage 60 or 160.

As described above, a sliding-type tripod constant velocity joint includes: an outer ring that has a cylindrical portion and that has three raceway grooves on an inner peripheral surface thereof, the three raceway grooves extending in a direction along a rotation axis of the outer ring; a tripod that has a boss portion coupled to a shaft and three tripod shaft portions that extend outward from an outer peripheral surface of the boss portion in a radial direction of the boss portion and that are inserted in the corresponding raceway grooves; an intermediate member that is provided around an outer periphery of a corresponding one of the tripod shaft portions so as to be rockable with respect to the corresponding one of the tripod shaft portions and that has a torque transmitting surface facing side surfaces of a corresponding one of the raceway grooves; a plurality of shaft-like rolling elements that are provided between the side surfaces of each raceway groove and a corresponding one of the torque transmitting surfaces so as to be rollable along the side surfaces of that raceway groove; and a cage that supports the corresponding rolling elements such that the rolling elements are able to circulate around an outer periphery of a corresponding one of the intermediate members, wherein the cage forms circulation paths that are trajectories of the circulating rolling elements and is formed of a pair of first circulation path forming member and second circulation path forming member that are coupled to face each other so as to respectively support both axial ends of the rolling elements, at least the first circulation path forming member has a window portion that is open so as to be able to introduce the rolling elements into the circulation paths laterally with respect to a circulating direction and a rib portion that is formed so as to extend from a periphery of the window portion toward an introducing direction in which the rolling elements are introduced, and after the rolling elements are introduced into the circulation paths, the rib portion is calked toward an opening of the window portion such that the rolling elements do not pass through the window portion.

With the above configuration, the cage is formed of the pair of first circulation path forming member and second circulation path forming member, and the rolling elements are introduced through the window portion that is formed in at least the first circulation path forming member. Then, after a predetermined number of the rolling elements are introduced into the circulation paths, the rib portion formed at the periphery of the window portion is calked toward the opening of the window portion. In addition, the "calking" in the invention includes not only bending so as to be crushed but also plastically deforming the rib portion such that the sectional shape is formed in an L shape or a circular arc shape.

In this way, as the rib portion is calked toward the opening of the window portion, the rolling elements introduced in the circulation paths are restricted by the calked rib portion from moving toward the outer side of the circulation paths through the window portion. By so doing, the rolling elements are not able to pass through the window portion, so it is possible to prevent the rolling elements from falling off from the cage. In addition, the cage is formed of the pair of circulation path forming members that are fixedly coupled to each other in advance. Thus, in comparison with the case where the cage formed of a plurality of components is fixedly coupled to be assembled while introducing the rolling elements into the cage, it is possible to easily perform assembling. Thus, the intermediate member is further arranged on the inner peripheral side of the cage to form the needle unit to thereby make it possible to simplify the process of externally fitting the needle unit around the tripod shaft portion.

The first circulation path forming member and the second circulation path forming member each may have the window portion and the rib portion, and the window portion of the first circulation path forming member and the window portion of the second circulation path forming member may be arranged so as to be located at the same circumferential position in the circulation paths. That is, each rolling element is introduced in such a manner that both end portions of the rolling element respectively pass through the window portions at the same time. By so doing, it is possible to reduce the amount of opening between the window portions in the axial direction of the rolling elements. In addition, by forming the window portions such that the rolling elements may be introduced into the circulation paths without inclination, it is possible to easily introduce the rolling elements.

The rib portion may be calked in the circulating direction in which the rolling elements circulate. That is, for example, the widthwise direction of the rib portion is set in the circulating direction of the rolling elements, and the rib portion is calked toward the opening of the window portions from both ends in the widthwise direction. Thus, it is possible to reliably prevent the rolling elements from falling off. In addition, by calking the rib portion, the calked rib portion is crushed, and it is possible to improve the strength of the rib portion.

The rib portion may be calked in a direction in which the pair of coupled circulation path forming members face. Here, the "direction in which the pair of circulation path forming members face" is a direction vertical to the circulating direction of the rolling elements and is the axial direction of the introduced rolling elements. Then, for example, the widthwise direction of the rib portion is set in the direction in which the pair of circulation path forming members face, and the rib portion is calked toward the opening of the window portion in the thickness direction. Thus, it is possible to reliably prevent the rolling elements from falling off. In addition, by calking the rib portion, the calked rib portion is crushed, and it is possible to improve the strength of the rib portion.

The window portion and the rib portion may be formed so as to be located at an outer peripheral side of the circulation path forming members. Conventionally, the window portion that introduces the rolling elements is formed at the inner peripheral side of the circulation path forming members. This is because, after the rolling elements are introduced into the cage, there is no possibility that the rolling elements fall off at the time when the intermediate member is arranged at the inner peripheral side of the cage. In contrast to this, in the present embodiment, after the rolling elements are introduced into the cage, the rolling elements are restricted by the rib portion from moving toward the outer side of the circulation paths and are not able to pass through the window portion, so it is possible to prevent the rolling elements from falling off irrespective of the presence or absence of the intermediate member. Then, it is possible to employ the configuration that the rolling elements are introduced from the outer peripheral side of the circulation paths to thereby make it easy to introduce the rolling elements. Thus, it is possible to improve workability at the time of assembling.

Each of the circulation path forming members may form the rounding circulation path, and the cage may be formed such that the circulation path forming members having the same shape are coupled to each other. By coupling such the pair of circulation path forming members, in comparison with the case where circulation path forming members having different shapes are coupled to each other, it is possible to simplify the process of assembling the cage. Furthermore, because the circulation path forming members have the same shape, management of the members may be simplified. Thus, it is possible to reduce the production cost of the cage.

Each of the pair of first circulation path forming member and second circulation path forming member may have a first coupling portion and a second coupling portion that have a plane asymmetrical shape with respect to a center of the cage, and the first coupling portion of the first circulation path forming member may be coupled to the second coupling portion of the second circulation path forming member, and the second coupling portion of the first circulation path forming member may be coupled to the first coupling portion of the second circulation path forming member. By so doing, the cage forms the circulation paths for the rolling elements, while the circulation path forming members may be made of members having the same shape.

DESCRIPTION OF REFERENCE NUMERALS 1 constant velocity joint
2 intermediate shaft
10 outer ring
11 cylindrical portion
12 coupling shaft portion
13 raceway groove
13a groove bottom surface
13b, 13c side surface
14, 15 raceway recess
14a, 15a bottom surface
14b, 15b side surface
20 tripod
21 boss portion
21a internal tooth spline
22 tripod shaft portion
30, 130 needle unit
40 intermediate member
41 first split member
42 second split member
41a, 42a, 41b, 42b end surface
41c, 42c tripod contact surface
41d, 42d torque transmitting surface
50 rolling element
51 rolling surface portion
52 inclined surface portion
53 protruding portion
60, 160 cage
70, 170 first circulation path forming member
80, 180 second circulation path forming member
71, 72, 81, 82 straight portion
73, 74, 83, 84 curved portion
75, 85, 175, 185 window portion
76, 86, 176, 186 rib portion
77, 87 first coupling portion
78, 88 second coupling portion
P1, P2 reference plane

The invention claimed is:

1. A sliding-type tripod constant velocity joint comprising:
an outer ring that has a cylindrical portion and that has three raceway grooves on an inner peripheral surface thereof, the three raceway grooves extending in a direction along a rotation axis of the outer ring;
a tripod that has a boss portion coupled to a shaft and three tripod shaft portions that extend outward from an outer peripheral surface of the boss portion in a radial direction of the boss portion and that are inserted in the corresponding raceway grooves;
an intermediate member that is provided around an outer periphery of a corresponding one of the tripod shaft portions so as to be rockable with respect to the corresponding one of the tripod shaft portions and that has a torque transmitting surface facing side surfaces of a corresponding one of the raceway grooves;
a plurality of shaft-like rolling elements that are provided between the side surfaces of each raceway groove and a corresponding one of the torque transmitting surfaces so as to be rollable along the side surfaces of that raceway groove; and
a cage that supports the corresponding rolling elements such that the rolling elements are able to circulate around an outer periphery of a corresponding one of the intermediate members,
wherein the cage forms circulation paths that are trajectories of the circulating rolling elements and is formed of a pair of first circulation path forming member and second circulation path forming member that are coupled to face each other so as to respectively support both axial ends of the rolling elements,
wherein at least one of the circulation path forming members includes a window portion that is open so as to be able to introduce the rolling elements into the circulation paths laterally with respect to a circulating direction,
wherein an adjustable rib portion extends from a periphery of the window portion toward an introducing direction in which the rolling elements are introduced, and the rib portion is configured to be adjusted in a direction of an opening of the window portion such that the rolling elements supported by the cage do not pass through the window portion.

2. The sliding-type tripod constant velocity joint according to claim 1, wherein
the pair of circulation path forming members each have the window portion and the rib portion, and
the window portion of the first circulation path forming member and the window portion of the second circulation path forming member are arranged so as to be located at the same circumferential position in the circulation paths.

3. The sliding-type tripod constant velocity joint according to claim 1, wherein the rib portion is calked in the circulating direction in which the rolling elements circulate.

4. The sliding-type tripod constant velocity joint according to claim 1, wherein the rib portion is calked in a direction in which the pair of coupled circulation path forming members face.

5. The sliding-type tripod constant velocity joint according to claim 1, wherein the window portion and the rib portion are formed so as to be located at an outer peripheral side of the circulation path forming members.

6. The sliding-type tripod constant velocity joint according to claim 1, wherein
each of the first circulation path forming member and the second circulation path forming member forms the rounding circulation path, and
the cage is formed such that the first circulation path forming member and the second circulation path forming member having the same shape are coupled to each other.

7. The sliding-type tripod constant velocity joint according to claim 1, wherein
each of the first circulation path forming member and the second circulation path forming member has a first coupling portion and a second coupling portion that have a plane asymmetrical shape with respect to a center of the cage, and
the first coupling portion of the first circulation path forming member is coupled to the second coupling portion of the second circulation path forming member, and the second coupling portion of the first circulation path forming member is coupled to the first coupling portion of the second circulation path forming member.

8. The sliding-type tripod constant velocity joint according to claim 1, wherein
wherein the adjustable rib portion is configured to be plastically deformed in the direction of the opening of the window portion.

9. A method of making a sliding-type tripod constant velocity joint, the constant velocity joint including an outer ring that has a cylindrical portion and that has three raceway grooves on an inner peripheral surface thereof, the three raceway grooves extending in a direction along a rotation axis of the outer ring; a tripod that has a boss portion coupled to a shaft and three tripod shaft portions that extend outward from an outer peripheral surface of the boss portion in a radial direction of the boss portion and that are inserted in the corresponding raceway grooves; an intermediate member that is provided around an outer periphery of a corresponding one of the tripod shaft portions so as to be rockable with respect to the corresponding one of the tripod shaft portions and that has a torque transmitting surface facing side surfaces of a corresponding one of the raceway grooves; a plurality of shaft-like rolling elements that are provided between the side surfaces of each raceway groove and a corresponding one of the torque transmitting surfaces so as to be rollable along the side surfaces of that raceway groove; and a cage that supports the corresponding rolling elements such that the rolling elements are able to circulate around an outer periphery of a corresponding one of the intermediate members, the cage forms circulation paths that are trajectories of the circulating rolling elements and is formed of a pair of first circulation path forming member and second circulation path forming member, the method comprising:
coupling the first circulation path forming member and the second circulation path forming member to face each other so as to respectively support both axial ends of the rolling elements;
introducing the rolling elements into the circulation paths laterally with respect to a circulation direction, through an open window portion that is provided with at least one of the circulation path forming members; and
calking a rib portion toward an opening of the window portion such that the rolling elements supported by the cage do not pass through the window portion after the rolling elements have been introduced into the circulation paths, wherein the rib portion extends from a periphery of the window portion toward an introducing direction in which the rolling elements are introduced.

10. The method of making a sliding-type tripod constant velocity joint according to claim 9, further comprising:
providing the pair of circulation path forming members with a window portion and a rib portion; and
arranging the window portion of the first circulation path forming member and the window portion of the second circulation path forming member so as to be located at the same circumferential position in the circulation paths.

11. The method of making a sliding-type tripod constant velocity joint according to claim 9, further comprising calking the rib portion in the circulating direction in which the rolling elements circulate.

12. The method of making a sliding-type tripod constant velocity joint according to claim 9, further comprising calking the rib portion in a direction in which the pair of coupled circulation path forming members face.

13. The method of making a sliding-type tripod constant velocity joint according to claim 9, further comprising forming the window portion and the rib portion so as to be located at an outer peripheral side of the circulation path forming members.

14. The method of making a sliding-type tripod constant velocity joint according to claim 9, wherein each of the first circulation path forming member and the second circulation path forming member forms the rounding circulation path, and the cage is formed such that the first circulation path forming member and the second circulation path forming member having the same shape are coupled to each other.

15. The method of making a sliding-type tripod constant velocity joint according to claim 9, wherein each of the first circulation path forming member and the second circulation path forming member has a first coupling portion and a second coupling portion that have a plane asymmetrical shape with respect to a center of the cage, the method further comprising:
coupling the first coupling portion of the first circulation path forming member to the second coupling portion of the second circulation path forming member, and coupling the second coupling portion of the first circulation path forming member to the first coupling portion of the second circulation path forming member.

16. The method of making a sliding-type tripod constant velocity joint according to claim 9, further comprising plastically deforming the adjustable rib portion in the direction of the opening of the window portion.

* * * * *